United States Patent [19]
Webb et al.

[11] Patent Number: 5,336,976
[45] Date of Patent: Aug. 9, 1994

[54] ILLUMINATION WARM-UP CONTROL IN A DOCUMENT SCANNER

[75] Inventors: Steven L. Webb, Loveland; Kevin J. Youngers, Greeley, both of Colo.

[73] Assignee: Hewlett-Packard Company, Palo Alto, Calif.

[21] Appl. No.: 54,649

[22] Filed: Apr. 26, 1993

[51] Int. Cl.$^5$ .................... H05B 41/39; G03B 27/72
[52] U.S. Cl. .................................... 315/134; 315/158; 315/219; 315/224; 315/226; 315/307; 315/360; 355/69; 355/229
[58] Field of Search ............... 315/76, 134, 151, 158, 315/219, 224, 226, 307, 308, 360; 355/35, 36, 37, 38, 68, 69, 70, 228, 229

[56] References Cited
FOREIGN PATENT DOCUMENTS
2164215  3/1986  United Kingdom ............... 315/134

Primary Examiner—David Mis
Attorney, Agent, or Firm—Augustus W. Winfield

[57] ABSTRACT

A method for determining when overall lamp intensity is stable for a lamp in a document scanner. The intensity of a relatively small portion of the lamp is controlled as part of a closed loop intensity control system. During a warm-up transient period, the intensity of the small portion of the lamp is monitored and power to the lamp is monitored. A changing power to the lamp indicates that the overall lamp intensity has not stabilized. Scanning is initiated when the intensity of the monitored portion of the lamp is within a predetermined control range and the power to the lamp has stabilized for a predetermined time period. The predetermined time period can be a default value or can be determined by a user.

4 Claims, 7 Drawing Sheets

5,336,976

ILLUMINATION WARM-UP CONTROL IN A DOCUMENT SCANNER

FIELD OF INVENTION

This invention relates generally to document scanning and more specifically to detection of stability of illumination intensity from a lamp immediately after applying power to the lamp.

BACKGROUND OF THE INVENTION

A document scanner is a device which converts a visible image such as a photograph, transparency or printed paper into an electronic form suitable for copying, storing or processing by a computer. Document scanners typically have a controlled source of light which is reflected off the surface of a document or is transmitted through a transparent document onto an array of photosensitive devices. The photosensitive devices convert received light intensity into an electronic signal. In some configurations, the light source is a long tube providing a narrow band of light which extends to each edge of one dimension of the document or beyond the edges.

For electric discharge lamps such as fluorescent lamps, intensity is a function of power and temperature. The temperature of the vapor or gas and the phosphors indirectly affects intensity. When such a light source is first powered on, light intensity varies dynamically along the length of the tube until the overall temperature of the light source stabilizes. Document scanners using such a light source typically wait for some intensity stabilization before scanning the document.

Document scanners could simply wait open loop for a worst case lamp warm-up time before initiating a scan. For typical light sources, the required time is on the order of tens of seconds. In general, such a delay adds unnecessary additional time to every scan. Such a delay is particularly inappropriate if the lamp is already warm. In order to minimize overall scan times, some sort of light source stability sensing is needed.

In some document scanners, an area having a calibrated reflectivity is provided somewhere outside the document area. The calibrated reflectivity area is used to sense the intensity of the light source. Such configurations typically monitor light from a small section of the light source and that small section is typically near one end of a long tube. Scanning is initiated when the intensity of light from the small monitored section becomes stable. During the warm-up thermal transient period however, the intensity of the small section may be stabilized or more particularly, may be controlled, but other portions of the lamp may still be in transition. A mechanical analogy is a system with a mass on each end of a spring. Controlling the position of one mass does not immediately control the position for the mass at the other end of the spring. Likewise, for a tube with finite thermal mass, controlling the light intensity at one location does not immediately control the light intensity at remote locations. For high accuracy, a more accurate measure of overall light source intensity stability is needed.

In some document scanners, a uniform reflectivity target is used to calibrate the sensitivity of individual sensors in an array of photosensors. If sensor calibration is made while the intensity of the light source is still dynamically changing, an inaccurate sensor calibration may result. As a result, even though the intensity of the light source may be stable for most of the scan, the sensors will be inaccurate for the entire scan because of inaccurate initial calibration.

In addition, in some document scanners, a preview scan is used to adjust settings such as contrast and brightness for a final scan. If the preview scan is performed with a light source in which intensity is still dynamically changing and the final scan is performed with a light source with a stabilized intensity, settings based on the preview scan may not be appropriate. An accurate or at least a repeatable measure of overall light source intensity stability is needed to ensure that final exposure settings based on a preview scan meet a user's expectations.

SUMMARY OF THE INVENTION

In the document scanner incorporating the present invention, light intensity of a relatively small portion of a lamp is controlled within a narrow range by using a closed loop intensity measurement and control system. In the present invention, power to the lamp is also monitored as a measurement of overall lamp intensity stability. When power is first applied to the lamp, scanning is delayed until light intensity of the small portion and power to the lamp have both stabilized.

DETAILED DESCRIPTION OF THE PREFERRED EMBODIMENT OF THE INVENTION

Figure 1:
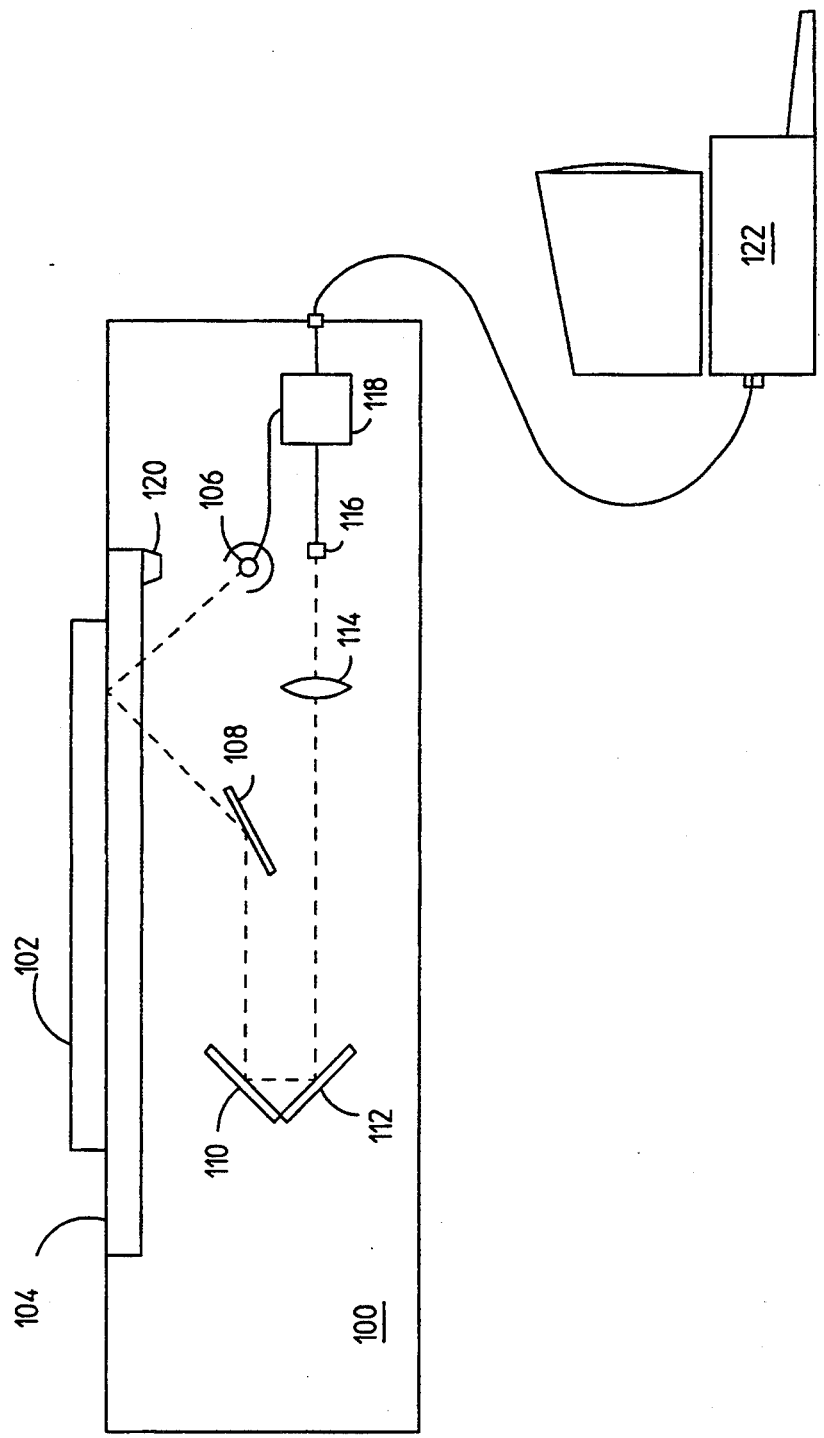
FIG. 1 is side view block diagram of a document scanner.

FIG. 1 is a block diagram illustration of a side view of a document scanner. Document scanner 100 has an opaque document 102 lying face down on a transparent platen 104. A lamp 106 projects a narrow line of light onto the face of document 102 which reflects onto mirrors 108, 110 and 112, through a focusing lens 114 onto photodetector array 116. In the configuration illustrated in FIG. 1 the lamp moves to provide a moving line of light along the stationary document 102 for detection by the photodetector array 116. In other configurations, the document may move past a stationary light source. Photodetector array 116 converts light into an electrical signal for a controller 118 which among other things controls the power going to lamp 106. A sensor calibration target 120 at one end of platen 104 is used to calibrate the photosensor array 116 before scanning the document 102. Controller 118 sends image data to a printer (not illustrated) for copying or to a computer 122. Controller 118 also receives control commands from computer 122.

Figure 2:
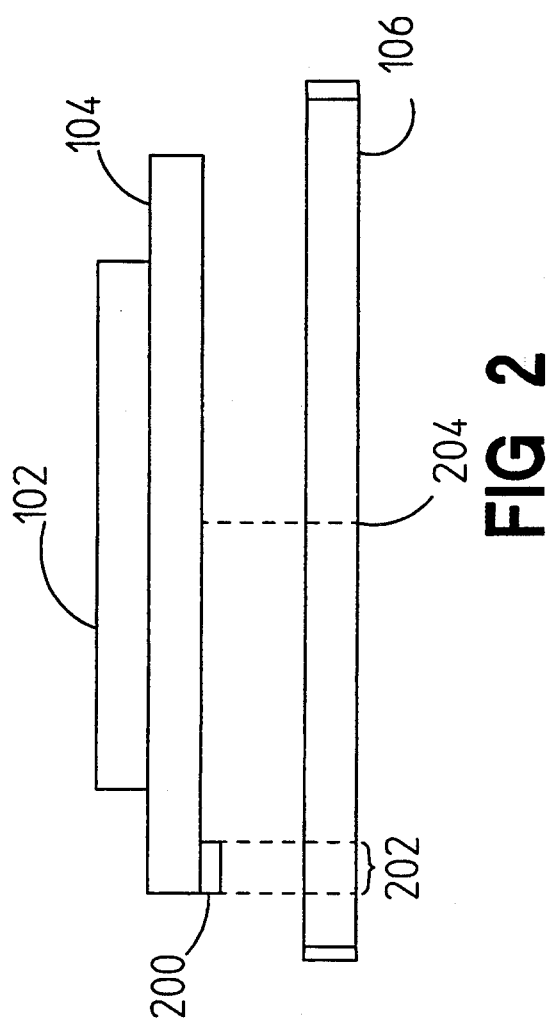
FIG. 2 is a front view block diagram of a document scanner.

FIG. 2 is a block diagram front view of some of the components of the document scanner 100. As in FIG. 1, the document 102 is lying face down on the transparent platen 104. The face of the document 102 is illuminated by the lamp 106. As illustrated in FIG. 2, the lamp 106 is a long tube extending beyond the edges of the document 102. A lamp calibration target 200 is used to calibrate the intensity of the light from the lamp 106. The lamp calibration target 200 may be a small reflective area just at one end of the platen 104 for initial calibration or it may extend along the entire length of the platen 104 for continuous closed loop control during a scan. Light from a relatively small calibration area 202 near the end of the lamp 106 is reflected from the lamp calibration target 200 onto the photosensor array 116 (FIG. 1).

After a brief warm-up transient time, light intensity from the calibration area 202 is controlled within a narrow range by a closed loop control system. The entire lamp 106 may still be in a transient thermal condition so that controlling the intensity at one location (calibration area 202) may not control the intensity throughout the lamp (such as at area 204 near the center of the lamp). During the transient temperature condition after first applying power, light intensity from the center area 204 may still be changing after light from the end area 202 is within a controlled range.

Figure 3:
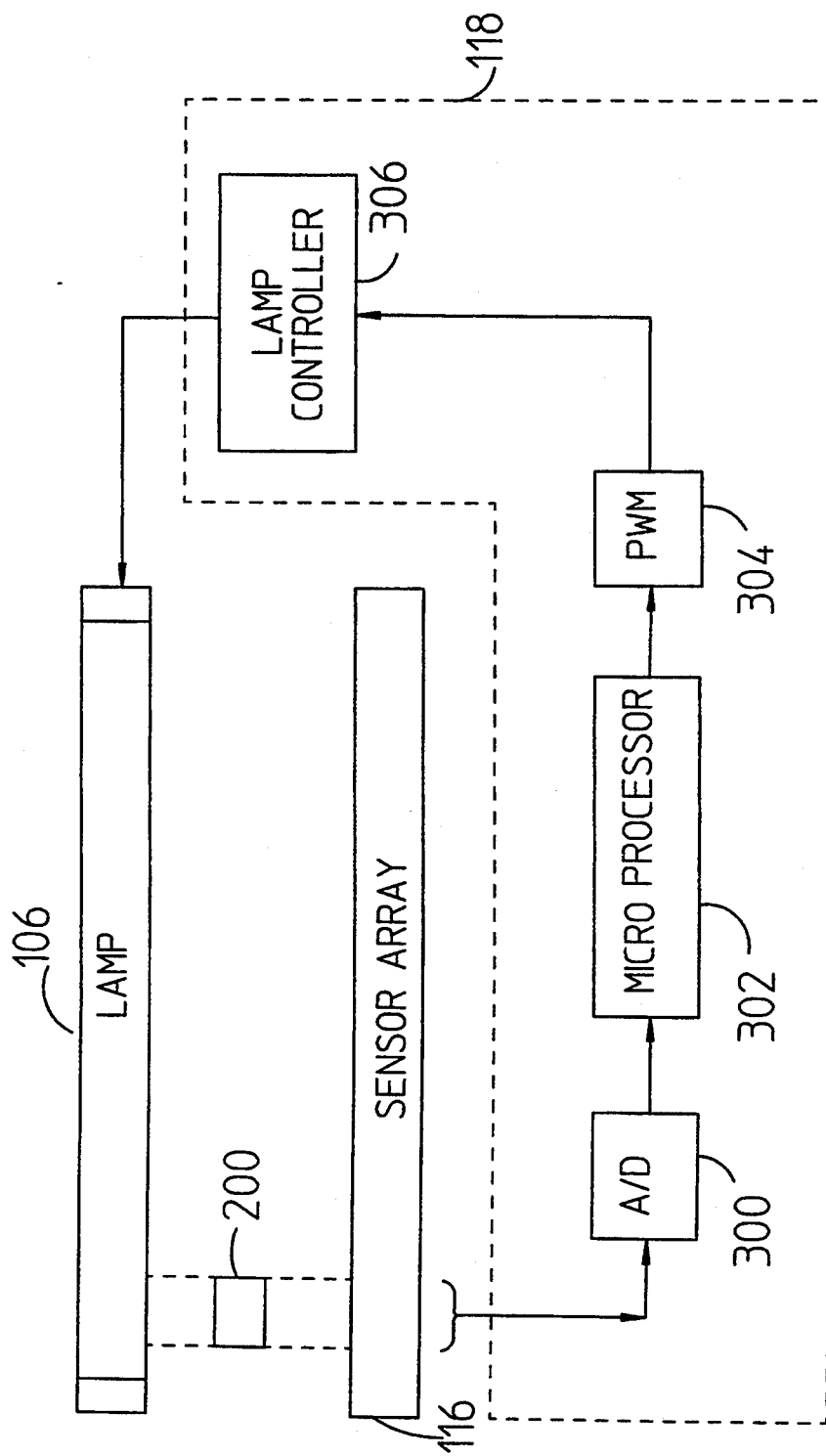
FIG. 3 is a block diagram schematic of lamp control circuitry.

FIG. 3 is a block diagram of the closed loop lamp intensity control circuitry. As illustrated in FIGS. 1 and 2, light from the lamp 106 is reflected from the calibration target 200 onto a portion of the sensor array 116. An average analog voltage signal from elements of the sensor array 116 which are illuminated by target 200 is converted to digital information by an analog to digital converter (A/D) 300. The digital information is processed by a microprocessor 302 which in turn drives a pulse-width-modulated voltage source (PWM) 304. The pulse-width-modulated voltage source 304 controls lamp controller circuitry 306 which in turn provides power for the lamp 106. In particular, the microprocessor 302 compares the digital output of the A/D 300 to an internal predetermined range of values. Power for the lamp 106 is controlled to keep the A/D 300 output within the predetermined range.

Figure 4:
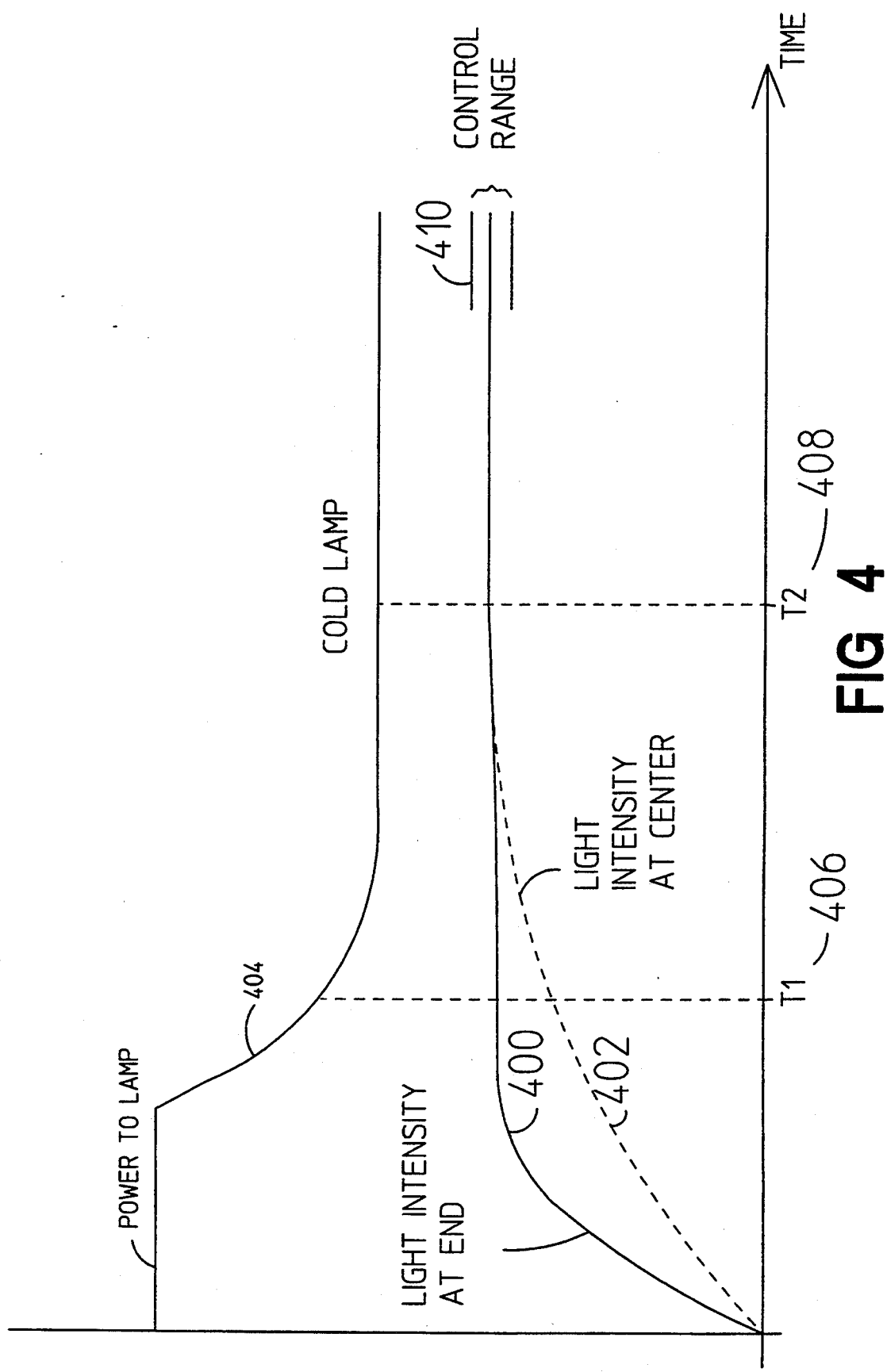
FIG. 4 is a graph of lamp intensity and lamp power as a function of time for a cold lamp.

FIG. 4 is a graph illustrating lamp intensity and lamp power as a function of time for a cold lamp. Light intensity from the end of the lamp which illuminates the calibration target (FIG. 2, 200) is illustrated by curve 400. As illustrated, the intensity increases over time approaching a controlled intensity range determined by the closed loop system illustrated in FIG. 3. Light intensity from the center of the tube (FIG. 2, 204) is illustrated by curve 402. Although illustrated as a smooth curve in FIG. 4, the intensity in the center of the tube may undergo a more complex transient change. The exact shape is not important for this invention. The essential point for the purpose of the present invention is that because of thermal time constants in the lamp, light along the length of the tube does not stabilize uniformly over time. Therefore, controlling the intensity in one area does not ensure controlled intensity for other areas until the transients have settled. The intensity of the light from the end of the tube is stable (controlled within the control range 410) at time T1 (406) and the intensity from the center of the tube is stable at time T2 (408).

Curve 404 illustrates the power input to the lamp as controlled by the lamp controller circuit (FIG. 3, 306).

As illustrated, for a cold lamp, maximum power is applied until the lamp intensity 400 approaches the controlled intensity range 410. The duty cycle of the PWM (FIG. 3, 304) is then reduced by the closed loop control system illustrated in FIG. 3 to control the intensity within a narrow range (FIG. 4, 410). An important element of the present invention is the observation that the duty cycle of the PWM (FIG. 3, 304) (and the resulting power to the lamp as illustrated by FIG. 4, curve 404) does not stabilize until the overall temperature stabilizes at time T2 (408). Using a mass/spring analogy, the position of a first mass at one end of a spring may be controlled to be relatively stationary but a dynamic force is required to maintain that position as long as a second mass is moving at the other end of the spring. In previous embodiments, sensor calibration using target 120 (FIG. 1) and scanning of the document started at time T1 (406) when the intensity of light at the end of the bulb is within the controlled range 410. In the present invention, sensor calibration and document scanning are delayed by the microprocessor (FIG. 3, 302) until the power 404 (as measured by the duty cycle of the PWM 304) has also stabilized at time T2 (408). This additional lamp stabilization time provides a significant improvement in scanning accuracy and repeatability.

Figure 5:
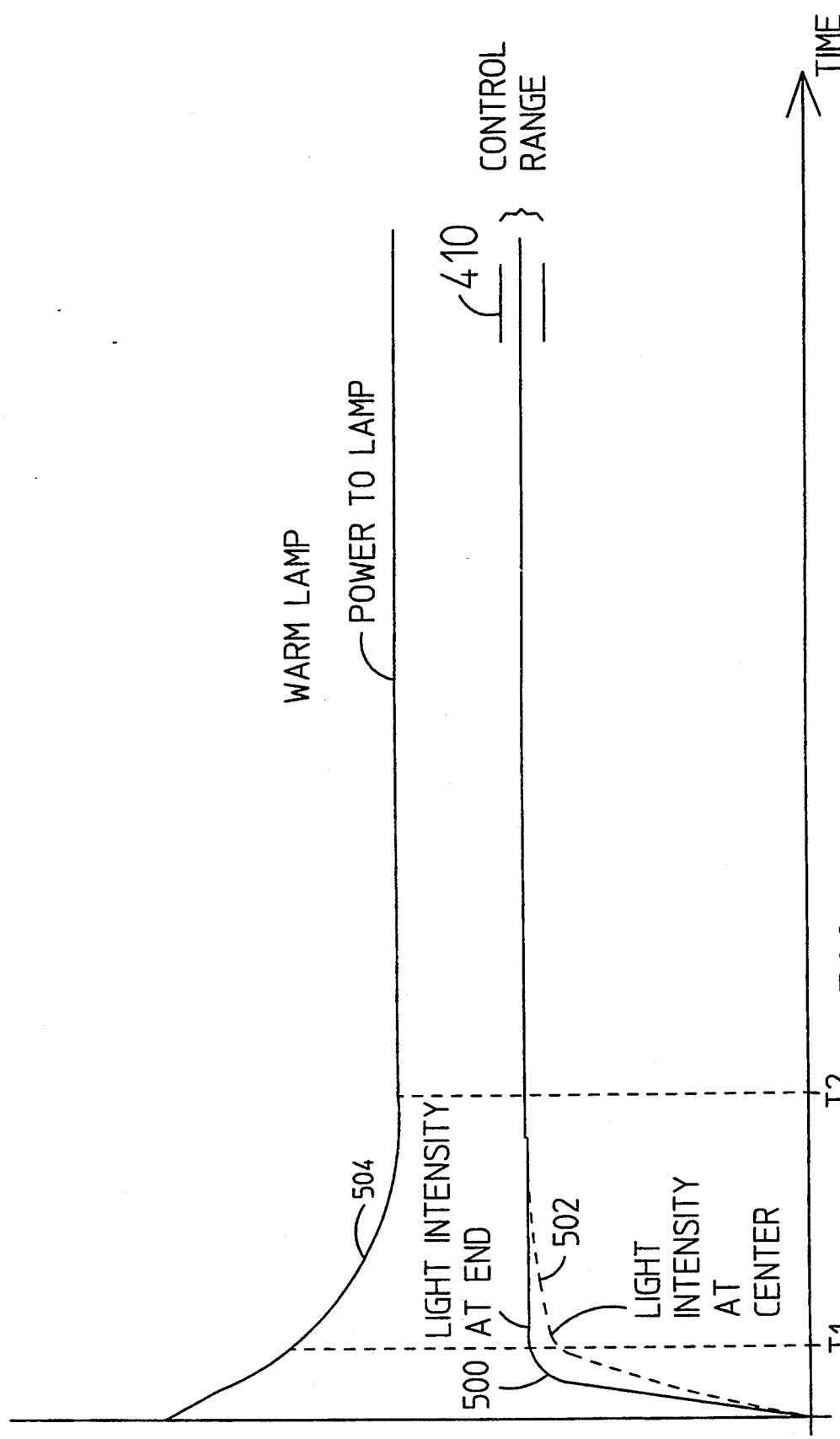
FIG. 5 is a graph of lamp intensity and lamp power as a function of time for a warm lamp.

FIG. 5 is a graph illustrating lamp intensity and lamp power as a function of time for a warm lamp. As illustrated in FIG. 5, for a warm lamp, the power 504 may start at something less than the maximum and light intensity at the lamp end 500 rapidly reaches the controlled range 410 at time T1 (506). Even for a warm lamp however, power 504 and light intensity at the lamp center 502 may stabilize at a significantly later time T2 (508). Again, in the present invention, scanning is delayed until time T2 (508).

Figure 6:
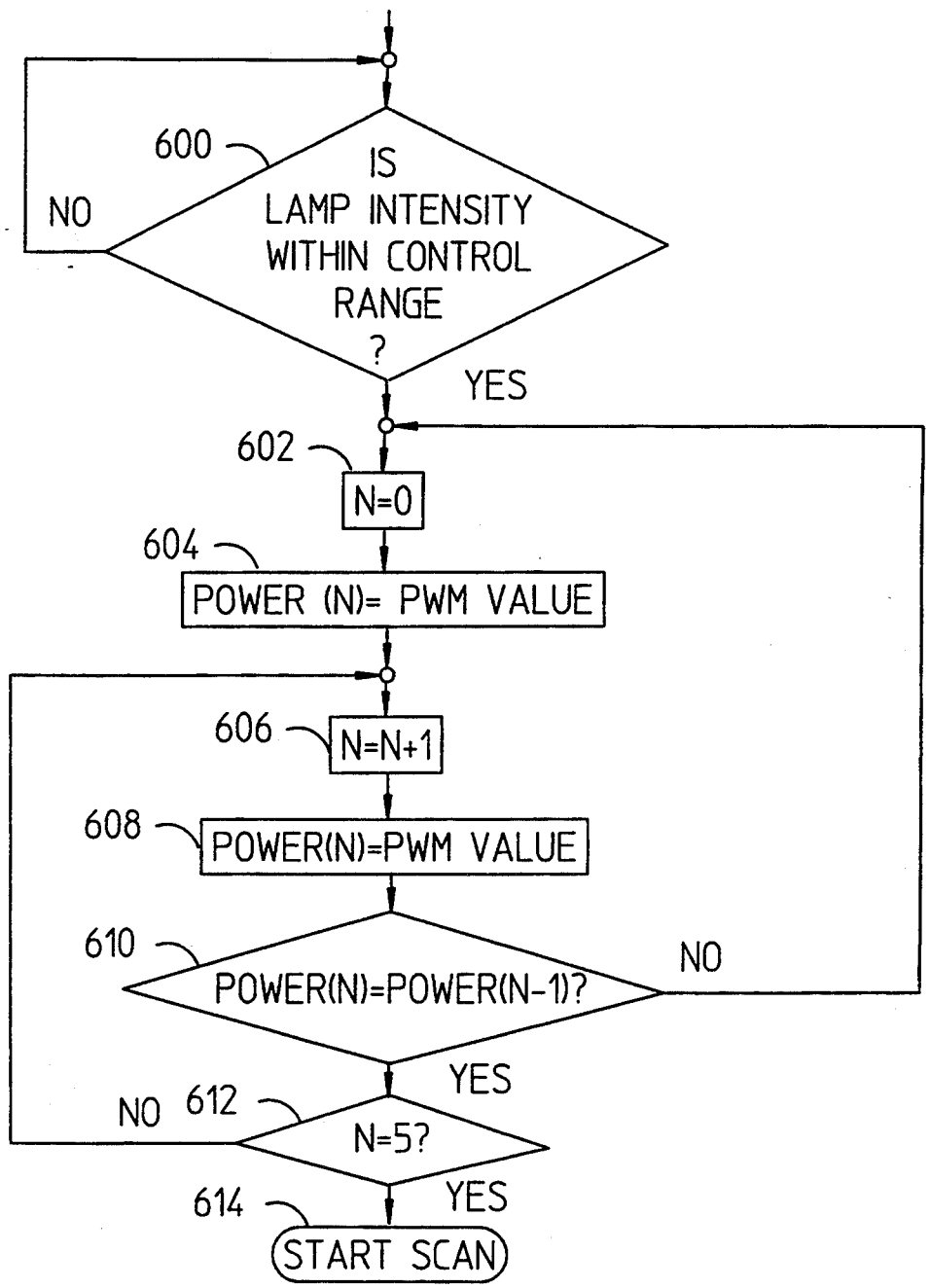
FIG. 6 is a flow chart illustrating the method of the present invention.

FIG. 6 is a flow chart illustrating the method of the present invention. First, lamp intensity is periodically monitored until lamp intensity is within the control range provided by the circuitry illustrated in FIG. 3. This occurs at time T1 in FIGS. 4 and 5. Then, the digital value going to the PWM (FIG. 3, 304) is periodically monitored. When the sampled digital PWM value is the same for 5 consecutive samples (FIG. 6, blocks 602–612), then the scan is started (614).

An alternative embodiment of the present invention provides user control of the warm-up delay. The user, through computer 122 (FIG. 1) to microprocessor 302 (FIG. 3) sends a command to determine the number of consecutive samples of the PWM value which must be the same (FIG. 6, 612) before the scan is started. The default value is 5 as discussed above. By setting the value for example to 1, the user can generate scans with minimal delay but with some sacrifice in quality (stable light intensity). This tradeoff may be appropriate for example when scanning binary line art or text. Alternatively, for photographs where uniformity of color is important, the user may choose to set the PWM consecutive count value to something greater than 5 to ensure better accuracy or repeatability.

Figure 7:
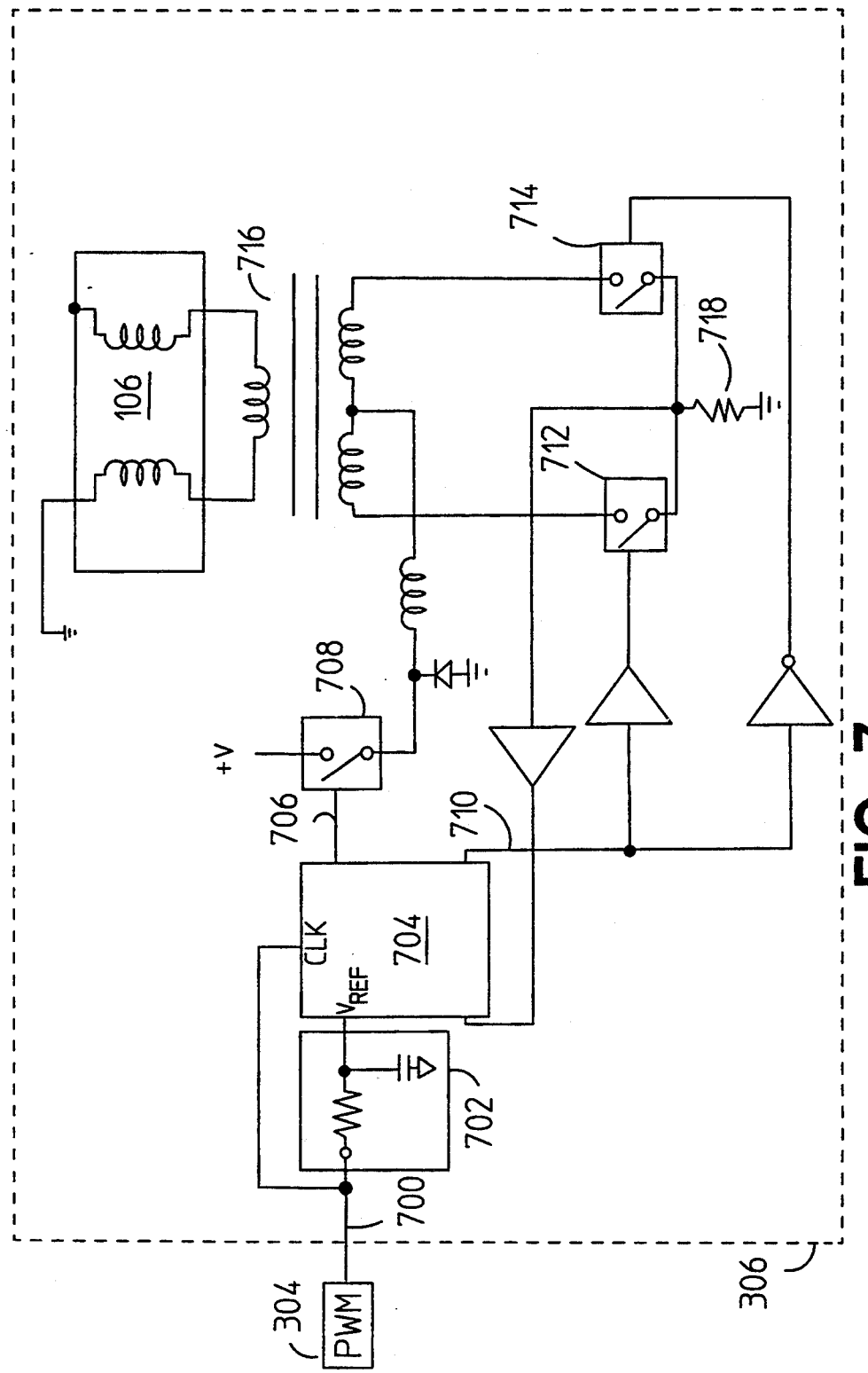
FIG. 7 is a block diagram schematic illustrating additional detail for lamp control circuitry for a fluorescent lamp.

In one specific embodiment, the lamp is one or more fluorescent lamps. FIG. 7 is a simplified block diagram schematic for the lamp controller (FIG. 2, 306) when using fluorescent lamps. In FIG. 7, PWM 304, lamp controller 306 and lamp 106 correspond to the like numbered items in FIG. 3. The pulse width modulated voltage signal 700 is filtered by a low pass filter 702 to provide a variable reference voltage for a switching current regulator circuit 704. The raw unfiltered pulse width modulated voltage signal also provides a clock input signal to the switching current regulator circuit 704. The switching current regulator circuit 704 has two outputs. The first output 706 is a pulse width modulated signal to an electronic switch 708. Note that the duty cycle of output 706 is not the same as the duty cycle of the input 700 from PWM 304. The duty cycle of output 706 is determined by a current control loop described below. The second output 710 of the switching current regulator circuit 704 is a square wave which alternately toggles electronic switch 712 and electronic switch 714.

Switches 712 and 714 alternately switch to provide a symmetrical bidirectional current through the primary of a transformer 716. The current through the primary is detected as a voltage at resistor 718. The voltage from resistor 718 is amplified and fed back to the switching current regulator 704 which in turn adjusts the duty cycle of output 706 to control the average current through the primary of transformer 716. The secondary of transformer 716 provides a high voltage which alternates in polarity from one end of the fluorescent lamp(s) 106 to the other end with current flowing from end-to-end through the gas or vapor in the lamp(s) 106. For simplicity of illustration, filament heating circuitry for the lamp(s) 106 is not shown.

For the specific embodiment using fluorescent lamps, the basic pulse frequency for the PWM (FIG. 3, 304) is 122,000 pulses per second. Light intensity is sampled by the A/D (FIG. 3, 300) every 4.5 msec. The lamp calibration target (FIG. 2, 200) is a neutral gray material with approximately 50% reflectance. The A/D (FIG. 3, 300) is an 8 bit converter (the digital range is 0 to 255). Based on the specific known reflectance of the lamp calibration target 200 and the control characteristics of the circuitry illustrated in FIG. 3, the control range (FIG. 4, 410 and FIG. 6, 600) for lamp end intensity is an A/D output value of 118±12. Therefore, for that specific embodiment, when the A/D output value is within the range of 106 to 130, the lamp end intensity for FIG. 6, decision 600 is considered to be stable. After the lamp end intensity is within the control range, the digital number controlling power (duty cycle of PWM 304) is monitored. The power value is sampled each time the intensity is sampled every 4.5 msec. If 5 (or another number determined by the user) consecutive samples of the power value are equal, then sensor calibration and scanning is initiated.

The above embodiment illustrates application of the present invention when using fluorescent lamps. The invention is equally applicable to any lamp with a significant thermal transient time including other electric discharge lamps such as halogen, sodium, neon, etc.

From the above description, it can be seen that the present invention improves scanning accuracy by more accurately determining when overall lamp intensity has stabilized. By adding a small delay which depends on measurable parameters, sensor calibration is more repeatable and more accurate, settings based on a preview scan are more repeatable and more accurate, and lamp intensity over the width of a document is more repeatable and more uniform.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for determining when a scan in a document scanning device is initiated after initial application of power to a lamp, the method comprising the following steps:
   a. applying electrical power to the lamp;
   b. monitoring intensity of a particular portion of the lamp;
   c. controlling power to the lamp to maintain the intensity of the particular portion of the lamp within a predetermined intensity range;
   d. monitoring power to the lamp; and
   e. initiating the scan by the scanning device if the intensity of the particular portion of the lamp is within the predetermined intensity range and if the power to the lamp is substantially constant for a predetermined amount of time.

2. The method of claim 1 wherein the lamp is an electric-discharge lamp.

3. A method for determining when a scan in a document scanning device is initiated after initial application of power to a lamp, the method comprising the following steps:
   a. receiving an input from a user, the input indicative of an amount of time;
   b. applying electrical power to the lamp;
   c. monitoring intensity of a particular portion of the lamp;
   d. controlling power to the lamp to maintain the intensity of the particular portion of the lamp within a predetermined intensity range;
   e. monitoring power to the lamp; and
   f. initiating the scan by the scanning device if the intensity of the particular portion of the lamp is within the predetermined intensity range and if the power to the lamp is substantially constant for the amount of time specified by the input from the user.

4. The method of claim 3 wherein the lamp is an electric-discharge lamp.

* * * * *